March 3, 1936.  J. SPÜHL  2,032,510
MACHINE FOR THE MANUFACTURE OF POCKET BANDS CONTAINING UPHOLSTERY SPRINGS
Filed May 16, 1934  9 Sheets-Sheet 1

Fig. 1.

J. Spühl
INVENTOR

By Marks & Clerk
ATTYS.

March 3, 1936.  J. SPÜHL  2,032,510
MACHINE FOR THE MANUFACTURE OF POCKET BANDS CONTAINING UPHOLSTERY SPRINGS
Filed May 16, 1934   9 Sheets-Sheet 5

J. Spühl
INVENTOR

By Marks & Clerk
Attys.

March 3, 1936.  J. SPÜHL  2,032,510
MACHINE FOR THE MANUFACTURE OF POCKET BANDS CONTAINING UPHOLSTERY SPRINGS
Filed May 16, 1934   9 Sheets-Sheet 6

J. Spühl
INVENTOR

March 3, 1936. J. SPÜHL 2,032,510
MACHINE FOR THE MANUFACTURE OF POCKET BANDS CONTAINING UPHOLSTERY SPRINGS
Filed May 16, 1934 9 Sheets-Sheet 7

J. Spühl INVENTOR

March 3, 1936.    J. SPÜHL    2,032,510
MACHINE FOR THE MANUFACTURE OF POCKET BANDS CONTAINING UPHOLSTERY SPRINGS
Filed May 16, 1934    9 Sheets-Sheet 8

J. Spühl
INVENTOR

By Menko & Clerk
ATTYS

Patented Mar. 3, 1936

2,032,510

UNITED STATES PATENT OFFICE 2,032,510

MACHINE FOR THE MANUFACTURE OF POCKET BANDS CONTAINING UPHOLSTERY SPRINGS

Julius Spühl, St. Gallen, Switzerland

Application May 16, 1934, Serial No. 726,002
In Switzerland March 28, 1934

17 Claims. (Cl. 226—18)

This invention relates to a machine for the manufacture of pocket bands filled with upholstery springs, which, in conjunction for example with a spring-winding machine and filling means, as described in British Patent No. 373,813, forms an automatic machine for the production of upholstery springs, for filling them into prepared pockets of textile fabric, for sewing up the latter and for turning the springs into their ultimate position for use.

One form of construction of the invention is illustrated by way of example in the accompanying drawings, in which

Figure 28 illustrates a part of the means for reciprocating the sewing machine;

Figure 1:
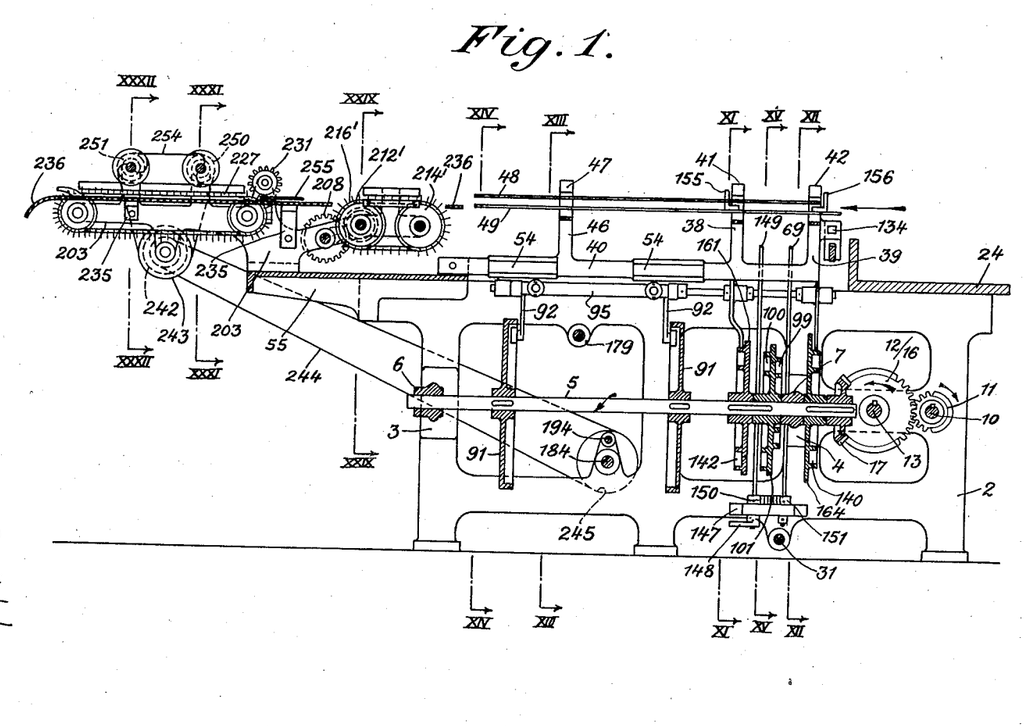
Figure 1 shows a longitudinal inside view of the machine according to the invention with a vertical section on the line I—I in Figure 2, certain parts being omitted for the sake of greater clearness.
Figure 2:
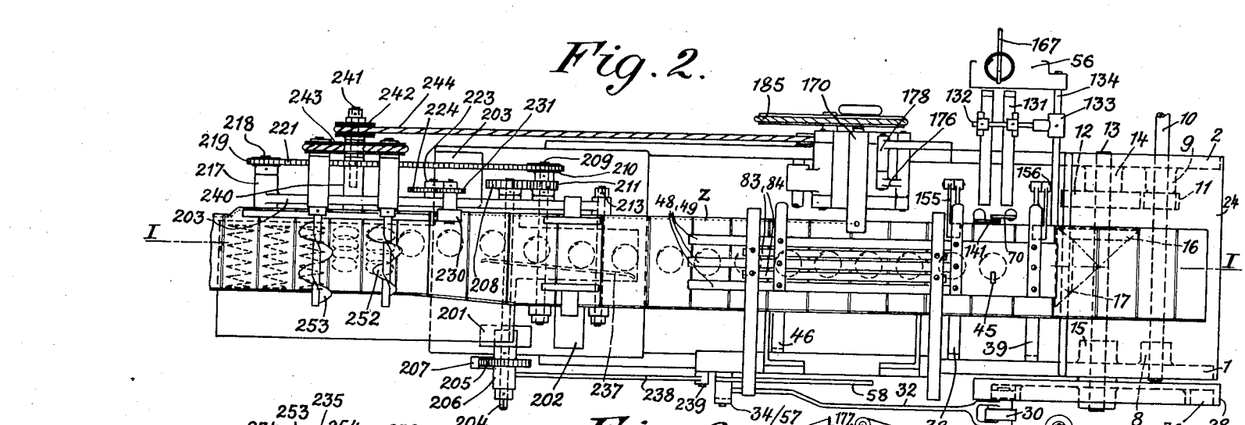
Figure 2 is a plan of the machine.
Figure 3:
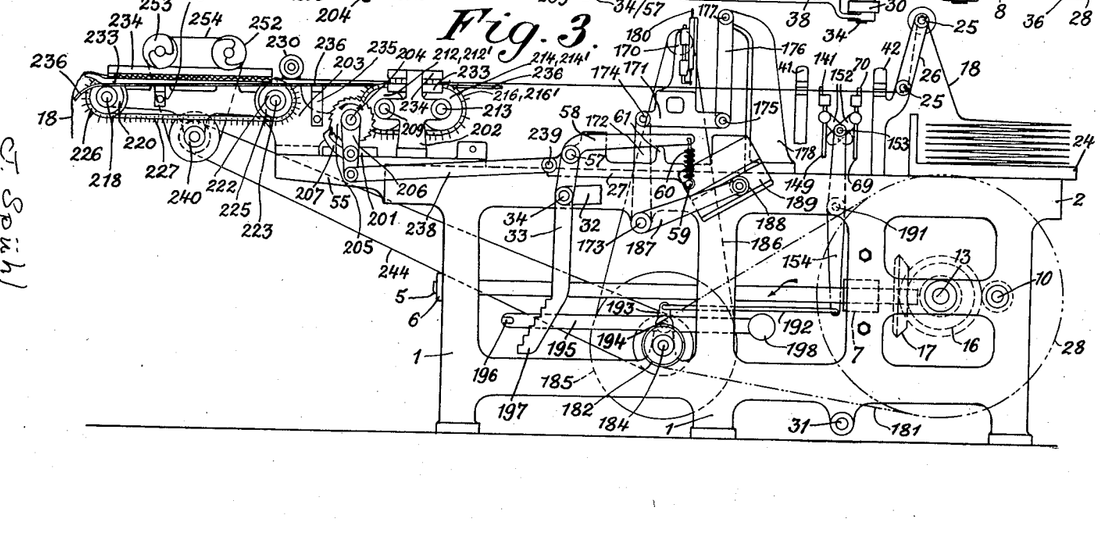
Figure 3 a longitudinal elevation of the machine.

Two standards 1 and 2, shown in Figures 1, 2 and 3, are screwed together with two cross bars 3 and 4, which carry bearings 6 and 7 for a main shaft 5. In bearings 8 and 9, shown in Figure 2, rests a driving shaft 10, connected with an upholstery spring-winding machine, not shown. Upon this driving shaft is mounted fast a toothed wheel 11, meshing with a toothed wheel 12, which is mounted fast upon a countershaft 13, running in bearings 14 and 15. Upon the countershaft 13 is mounted fast a bevel wheel 16, which meshes with a bevel wheel 17 secured upon the main shaft 5.

Figures 4, 4A, 5:
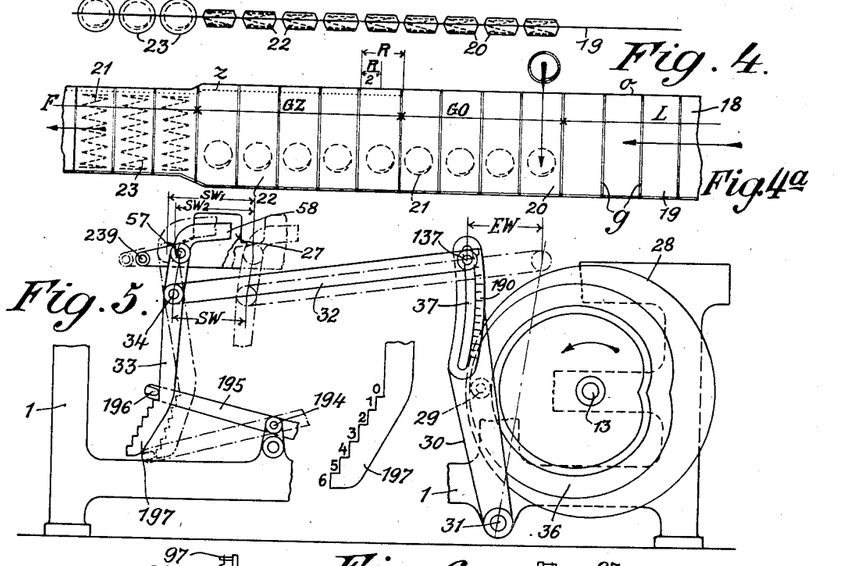
Figure 4 represents in longitudinal elevation a piece of a pocket band in different stages of treatment.
Figure 4a is a plan view of the same piece of the pocket band.
Figure 5 shows a device for regulating the forward feed of the pocket band.

In Figures 4 and 4a are shown empty pockets 19 upon a band portion L. When they come on to the machine they are closed on the three sides g, while the side o of each pocket is still open. It is to be noted that the seams between the individual pockets extend for the full breadth of the band. The pockets marked 20 contain upholstery springs 21 in the compressed condition in which they have been inserted. The axis of the spring is here perpendicular to the plane of the pocket band. Upon the length GO in Figure 4a are shown pockets containing springs but still open, and on the length GZ are shown pockets 22 containing springs wherein the side of the pocket band that was previously open has been sewn up with a seam Z, and in the pockets 23 the spring is turned in its pressing direction through 90 degrees into the position for use. The breadth of the pocket is denoted by R. The direction in which the pocket band travels through the machine is indicated by two arrows.

Figure 6:
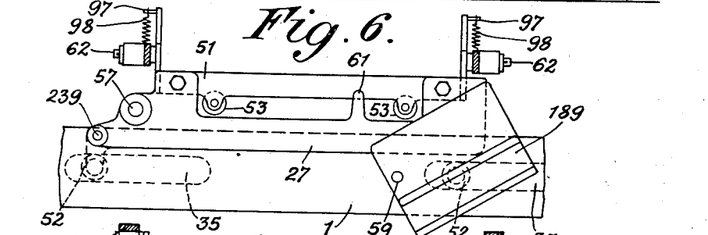
Figure 6 shows in side elevation a carriage for the conveyor that advances the pocket band.
Figure 7:
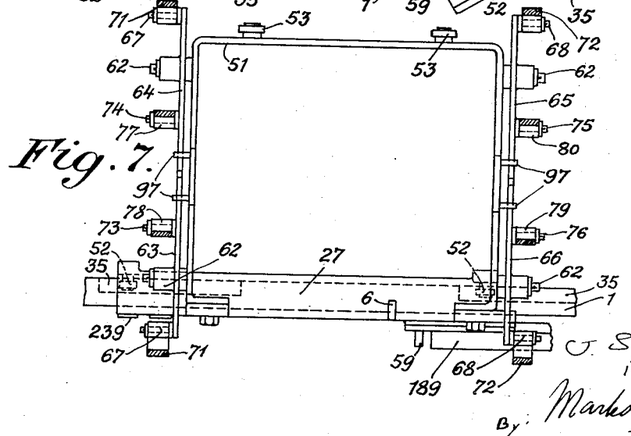
Figure 7 shows a corresponding plan, with a horizontal section on the line VII—VII in Fig. 14.
Figures 13, 14:
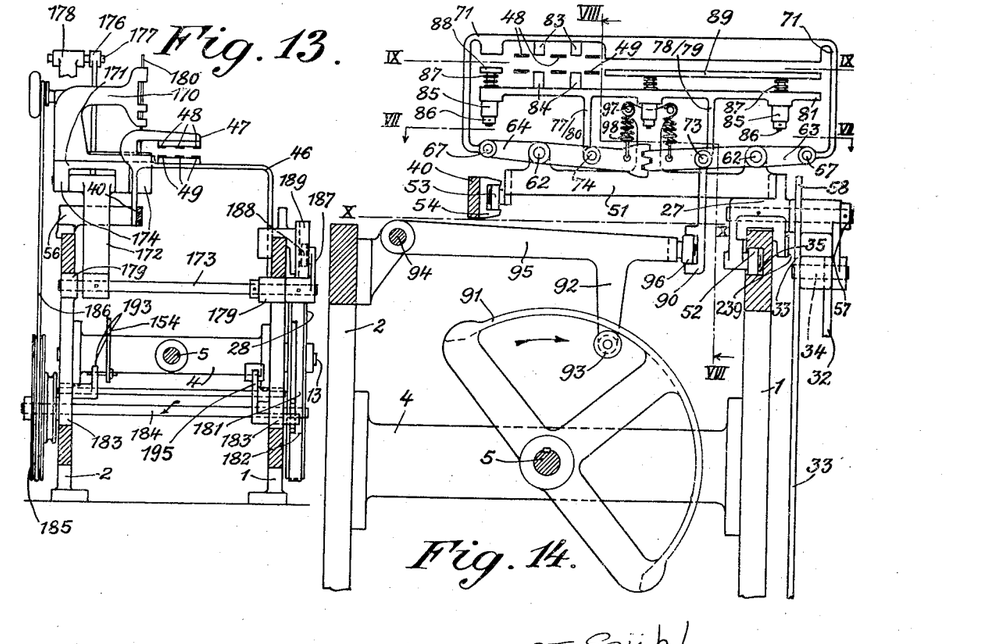
Figures 14 and 15 show on a larger scale vertical sections on the lines XIV—XIV and XV—XV respectively in Figure 1.

At the rear of the machine frame formed by the standards 1 and 2, that is to say, at the right hand side of Figures 1, 2 and 3, is secured a table 24, shown in Figure 3, upon which is laid the empty pocket band 18 of any convenient length. This band is laid over and under guide bars 25, which are held by arms 26 mounted upon the standards 1 and 2. For the forward feeding of the pocket band a slide or carriage 27, shown in Figures 5, 6 and 14, is employed, which can be reciprocated along the standards 1 and 2 by means of a belt pulley 28, shown in Figure 5, which is mounted upon the shaft 13, and contains upon the external end face a cam groove 36. In this groove engages a roller 29, which is carried by a swing lever 30, pivoted in a bearing 31 on the standard 1. To this swing lever is attached by means of a pivot 137, which is movable along an arcuate guide 37, a connecting rod 32, the other end of which is pivoted by means of a pin 34 to a lever 33, which is suspended by means of a pivot 57 from the slide 27. The cam groove 36 in the pulley 28 is so shaped that the speed of the slide 27 is uniformly accelerated. The arcuate guide 37 of the swing lever 30 forms the arc of a circle having its centre upon the axis of rotation 34 of the lever 33, so that in a manner more fully described below, the path of the conveyor slide 27 can be determined and altered, to correspond to the breadth R of the pocket 19, without the slide itself being moved in this adjustment.

*Table.*—Two table bearers 38 and 39, shown in Figures 1, 2, 11 and 12, are secured at one end to the standard 1 and at the other end to a connecting bar 40, and have on the top stirrup-like holders 41 and 42 respectively. The upper arms of these holders carry together a plate 43, and the lower arms a plate 44. These two plates 43 and 44 have each an aperture 45, shown in Figures 2 and 15. Further forward there is fitted to the bar 40 in a similar manner a third bearer 46, which carries at the top a stirrup-like holder 47, shown in Figure 13, to which are secured on the inner side above and below three thin rods 48 and 49 respectively, which lie in one plane with the two plates 43 and 44 respectively. The lower plate 44 is prolonged towards the standard 2 and roughened in order that the fabric may not slip there, and it has an aperture 50, shown in Figures 15 and 16.

To the slide 27 is secured a carriage frame 51, shown in Figures 6 to 9 and 14, and two running rollers 52 are provided, which run in grooves 35 hollowed out in the standard 1. On the carriage frame 51 are provided two running rollers 53, which each run between two rails 54 secured to the connecting bar 40. The bar 40 is secured at the front upon a plate 55 (Fig. 1) carried by the standards 1 and 2, and at the rear to an arm 56 (Figs. 11 to 13), which is screwed to the standard 2. The arm 58 of the lever 33, located above the pivot 57, is pulled by means of a tension spring 60 secured to a bolt 59 on to a stop 61 fitted to the slide 27, as shown in Figures 3 and 6. By means of the swing lever 30, the connecting rod 32 and the lever 33 therefore, the slide 27 can be reciprocated by the belt pulley 28 upon the standard 1 and the connecting bar 40.

Figure 8:
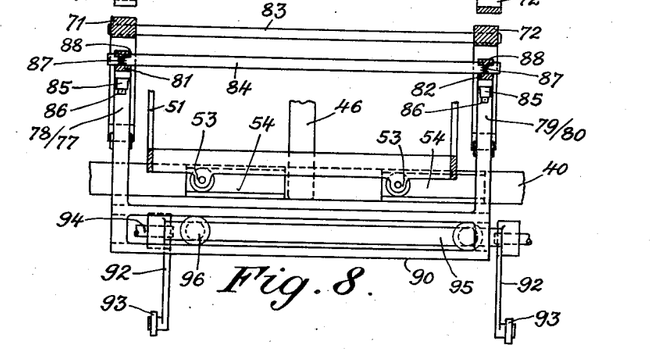
Figure 8 is a view similar to Figure 6, with section along the broken line VIII—VIII in Figure 14, certain parts being omitted.

The conveying device for intermittently advancing the pocket band 18, comprises pressing means, to which pertain four double levers 63, 64, 65 and 66 (Figs. 7 and 14) mounted upon pivots 62 on the carriage frame 51, these levers meshing with one another like toothed wheels at one end, and carrying at the other end pivots 67 and 68 for stirrups 71 and 72. The double levers 63, 66 and 64, 65 also carry pivotally by means of the pins 73, 74 and 75, 76 four struts 77, 78, 79 and 80, shown in Figures 7, 8 and 14, which are also secured to bearers 81 and 82. The two stirrups 71 and 72 (Figures 8 and 14) are connected with one another by two rods 83, and the two bearers 81 and 82 are connected with one another by similar rods 84. In each of three hubs 85 on the bearer 81 is fitted a striking bolt 86 and a compression spring 87, whereby a stamp 88 on the one hand and a bar 89 on the other hand are limited in an upward direction and resiliently supported. Above this bar 89 the stirrups 71 and 72 are more strongly constructed, as Figure 14 shows. The two struts 78 and 79 are prolonged downwards and carry a running rail 90, as shown in Figures 8, 10 and 14.

Figure 9:
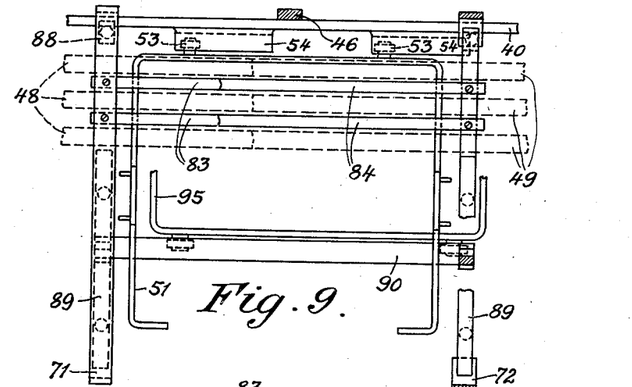
Figure 9 shows on the left a plan of a pressing device belonging to the conveying means, and on the right a section through individual parts on the line IX—IX in Figure 14.
Figure 10:
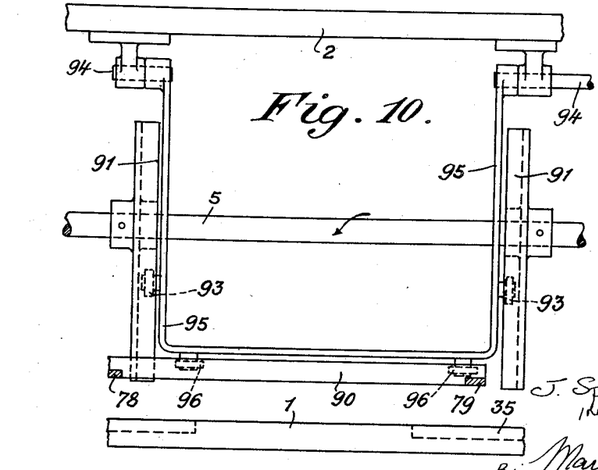
Figure 10 shows a plan of the driving members of the pressing device located underneath the line X—X in Figure 14.

Upon the main shaft 5 are mounted fast two half cams 91, shown in Figures 10 and 14, which from time to time each engage over a roller 93, these rollers being carried by one of the arms 92 of a U-shaped lever 95, which is rotatable about pivots 94. The pivots 94 are supported on the standard 2, and the lever 95 engages with two rollers 96 located in its central portion in the running rail 90, as shown in Figure 14, so that by the engagement of the cams 91 with the rollers 93 the pressing means 71 to 81 is opened. If the two half cams 91 set free the rollers 93 and therefore the lever 95, then by the action of tension springs 98 secured to the carriage frame 51 in pins 97 at one end and to the levers 63, 64 and 65, 66 at the other end, the rods 84 carried by the carriers 81, the stamps 88 and the bar 89 on the one hand, and the bearers 71, 72 and the rods 83 on the other hand, are pressed against one another. The four rods 83, 84 come to life lengthwise between the stationary rods 48, 49 as shown in Figs. 2, 9 and 14. During one revolution of the semi-cams 91, the pressing means can therefore be opened and closed once, this being done at every travel in question of the slide 27.

For the purpose of opening the pockets, in order that a box containing a compressed upholstery spring may be introduced, there serves the means illustrated in Figures 15 to 24. Upon the main shaft 5 is mounted a disc with two closed cam grooves 99 and 100, shown in Figures 1 and 15, and a peripheral cam groove 101. The cam groove 100 actuates a lever 104, which is supported upon a shaft 102 and provided with a roller 103, and to which is pivoted a rod 105, which forms one arm of a double lever rotatable about a pivot 112, the other arm 106 of which is pivotally attached by means of a pin 111 to a hook lever 109 supported by means of a pin 107 upon the plate 43. To the rod 105 is pivoted a hook lever 110, which is rotatable about a pivot 108 supported upon the plate 44. The cam groove 101 actuates a lever 115 which is supported at the point 113 and provided with a roller 114, and which, by means of a rod 116 rotatably supported at 117, imparts an upward and downward swinging movement to a fabric lifter 118, which is rotatable about the pin 107 and is provided with a foot 166. Upon the pivot 117 is mounted a finger 122, which is provided with a slot 119 and is connected at the point of articulation 120 with a joint piece 121 rotatable about a pivot 111, and which carries underneath a piece of india rubber 123. While the hook levers 109 and 110 and the fabric lifter 118, by means of the said cam grooves and rodding, execute arcuate movements about the points 107 and 108, the finger 122 executes a curved movement shown in the diagram in Figure 25, because the pivots 117, 120 and 111 are not stationary but move under the influence of the two cam grooves 100 and 101.

The cam groove 99 actuates the lever 125 (Fig. 15), which is supported upon the shaft 102 and provided with a roller 124, and which, in conjunction with a rod 126, moves the lever 129, 165 which is supported at the point 127 and connected at the point 128.

Figures 11, 12:
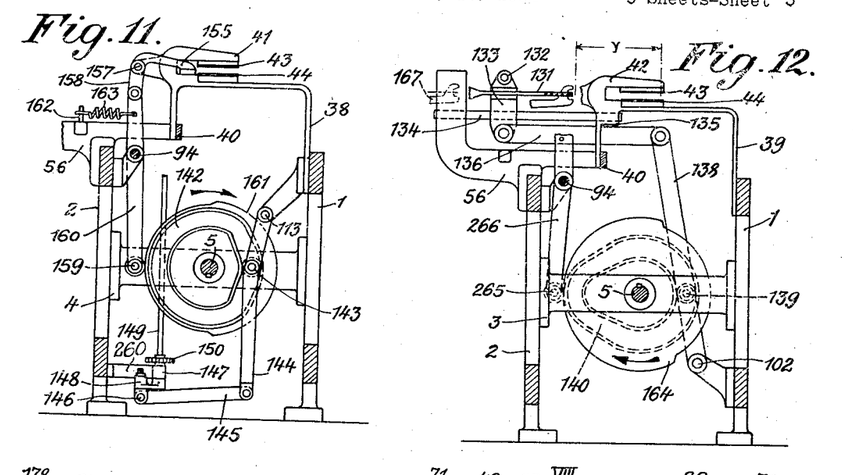
Figures 11, 12 and 13 show cross sections through the machine on the lines XI—XI, XII—XII and XIII—XIII respectively in Figure 1.
Figures 21, 22, 23, 24, 25, 26, 27:
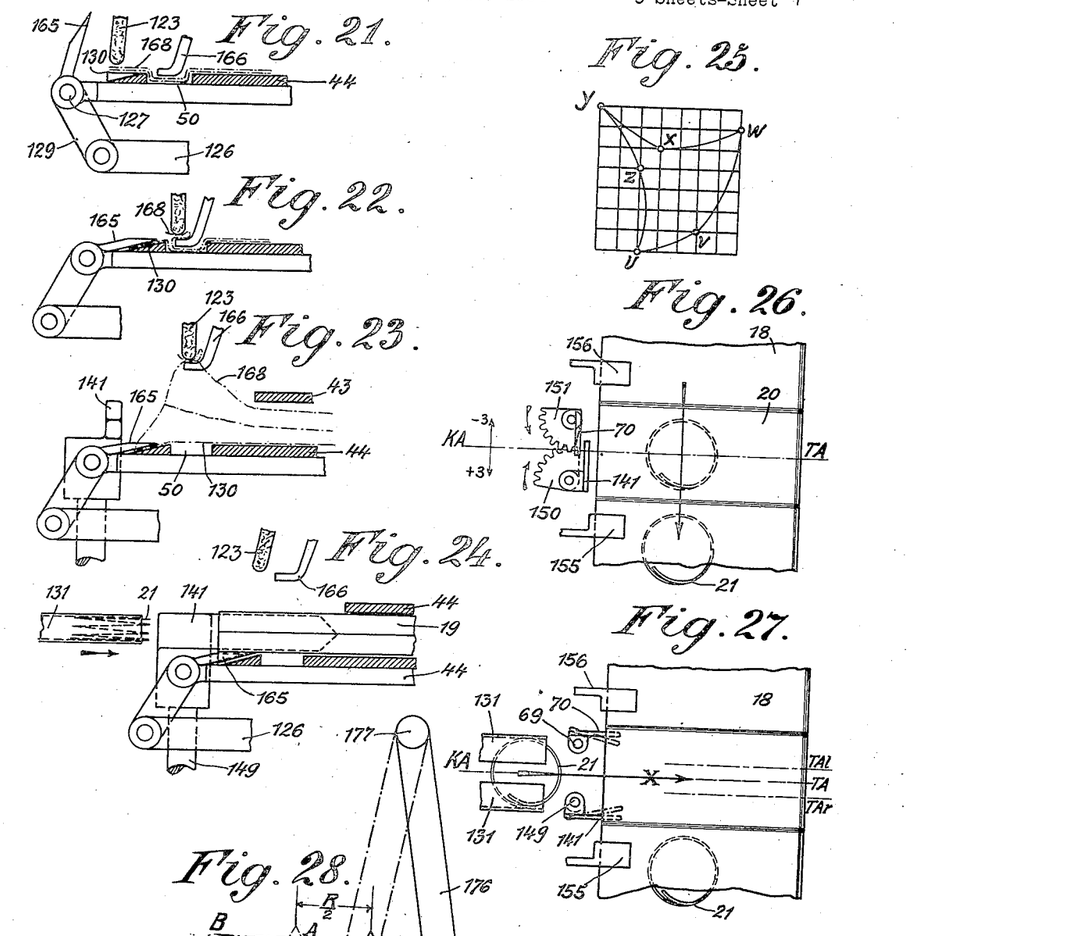
Figures 21, 22, 23 and 24 illustrate the opening of the pockets in different stages of this operation.
Figure 25 is a diagram of this operation.
Figures 26 and 27 show in plan a piece of a pocket band with a device for spreading upon a pocket to be provided with a spring, this device being shown in two different positions.

The box or casket, shown in Figures 2, 12 and 24, consists of two halves 131, which are adjustable relatively to one another to the diameter of an upholstery spring, and which are slidably and clampably mounted upon a common rod 132. The latter is secured in a guiding piece 133 (Fig. 12), which is mounted upon a square rod 134, which is secured to the arm 56 and to a bearing 135 on the table bearer 39. By means of a tension rod 136, which is pivoted to a lever 138, supported upon the shaft 102, and by means of a roller 139 carried by the latter, which bears on an eccentric 140 mounted on the main shaft 5, the rod 132 can be moved to and fro through the the path y, Figure 12.

Figure 33:
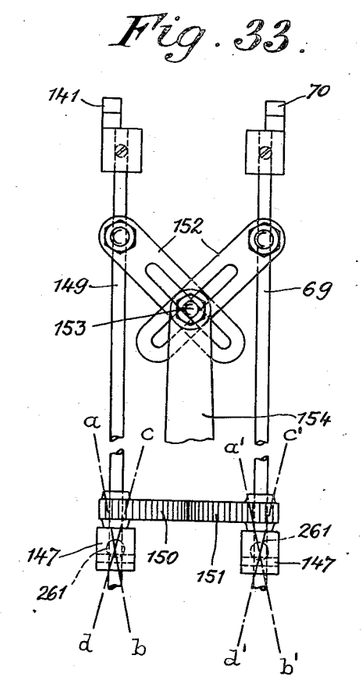
Figures 33 and 34 are front and side views of parts of the spreading device.
Figure 34:
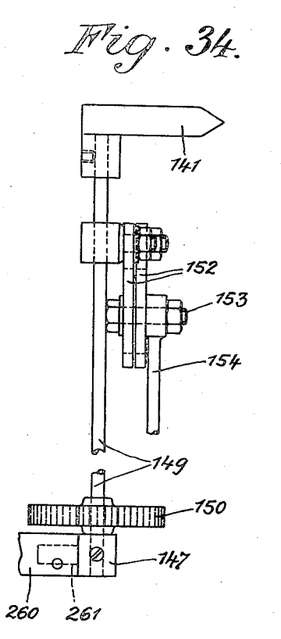

The two spreaders 141 and 70, shown in Figures 26, 27, 33 and 34 serve for spreading out the pocket after the latter has been opened for the introduction of a filled box 131. They obtain their quarter revolution by the eccentric 142 (Fig. 11) mounted upon the main shaft 5, by which the lever 144, supported at the point 113 and provided with a roller 143, is reciprocated once for each spring to be introduced, this lever in its turn by means of a rod 145 pivoted to it and of a block 146, pulls to and fro a lever 148 supported in a bearing 147 pivotally mounted on a fixed arm 260 by means of a pin 261 (Figs. 33 and 34). With this lever is firmly connected a bar 149, which carries the spreader 141 and the toothed segment 150, which meshes with a similar toothed segment 151 (Figs. 26 and 33) provided upon a bar 69, which carries the strut 70. The supporting means of the two bars 149 and 69 and the teeth of the segments 150 and 151 are so constructed that the two spreading struts 141 and 70 can execute their rotary movement even if they are adjusted, by means of two slotted lugs 152, which are secured (Fig. 3) by means of a screw 153 to a lever 154, to correspond to any desired breadth of pocket, that is to say, if the rods 149 and 69 occupy a somewhat oblique position as indicated in a somewhat exaggerated degree, by the dash dotted lines ab, a'b', and cd, c'd', of Fig. 33, the pins 261 forming the rocking axis in this case.

The flaps 155 and 156, shown in Figures 26 and 27, are for the purpose of holding fast the pocket band, at a moment more specifically indicated below, on both sides of the pocket, which is ready to receive a spring. They obtain their drive each from one of the two similar eccentrics 161 and 164, shown in Figures 11 and 12, which are mounted fast upon the main shaft 5. The flap 155 is carried by a lever 158 pivoted at the point 157, this lever being pivotally connected to the upper end of a lever 160, which is supported on a pivot 94 and actuated by means of a roller 159 by the peripheral eccentric 161. A tension spring 163 suspended from the arm 56 by a pin 162 and from the lever 160, presses the roller 159 constantly against its eccentric 161, mounted upon the shaft 5. The peripheral eccentric 164 (Fig. 12) actuating the flap 156, acts upon a lever 266, which is supported upon a shaft 94 and is provided with a roller 265. The lever 266 is pressed upon its eccentric 164 in a manner similar to that mentioned with respect to the lever 160 by means of a tension spring 163, shown in Figure 11.

Figures 15, 19, 20:
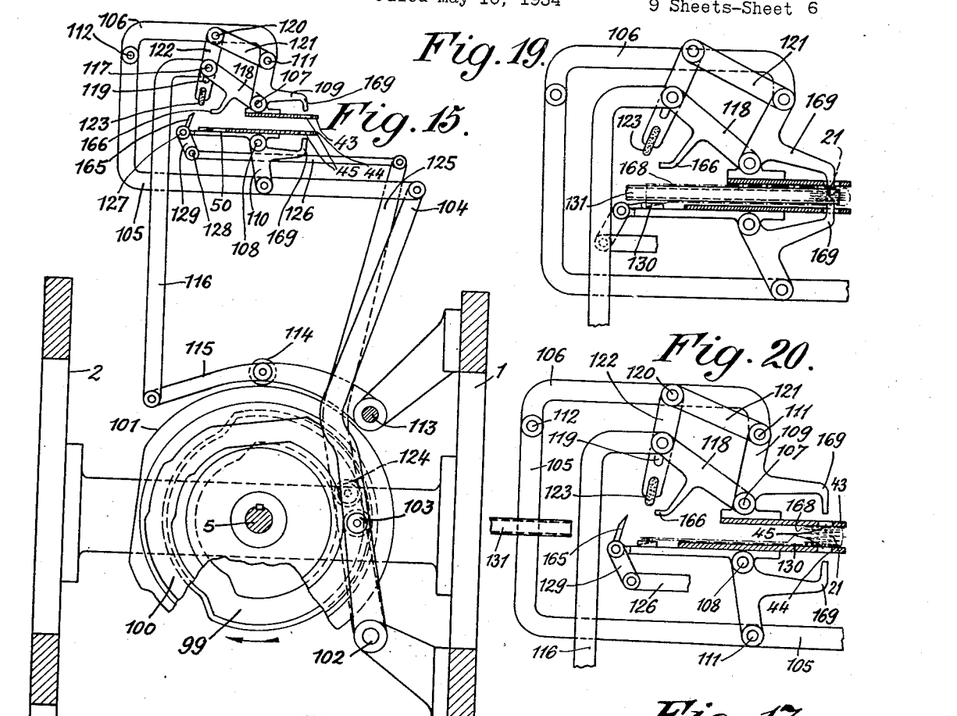
Figures 19 and 20 show the same apparatus as the Figures 16, 17 and 18, but in different working positions.
Figures 16, 17, 18:
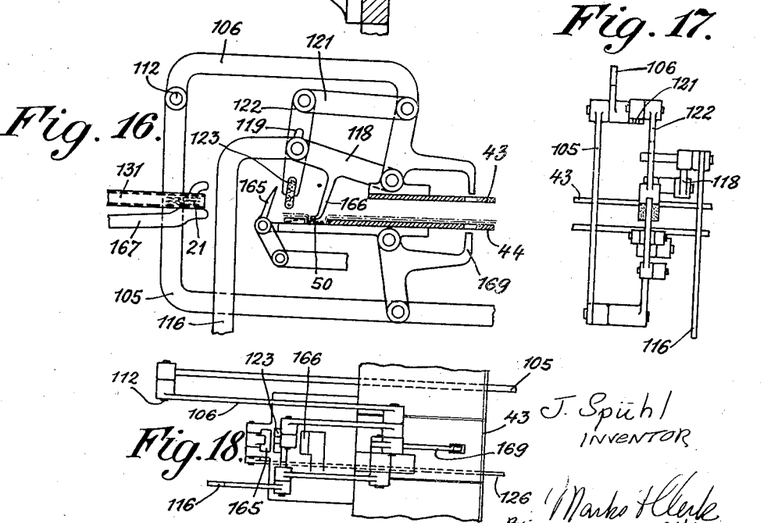
Figures 16, 17 and 18 show in front elevation side elevation and plan respectively the means for opening the pockets in the pocket band before introducing springs.

The procedure for opening the pockets and introducing the spring into the latter is as follows: While the pocket band 18 is being held fast by the pressing means described, and advanced to the extent of one pocket, the parts 165, 166 and 123 (Fig. 20) remain stationary; they are in the initial position again. As soon as the pocket band, after the advance, is stationary again, the fabric lifter 118 (Figures 16 and 20) moves with its foot 166 upon the fabric and presses the latter into the aperture 50 in the plate 44. The india rubber piece 123 of the finger 122 puts the upper pocket layer 168 on to the foot 166 of the fabric lifter 118 (Figs. 21 and 22) and since the front portion of the plate 44 is roughened in the neighborhood of the aperture 50, the lower pocket layer 130 here remains stationary. As soon as the upper pocket layer is stripped on to the foot 166 the holder 165 moves on to the lower pocket layer 130 (Figure 22), whereupon the fabric, held by means of the piece of india rubber 123 and the fabric lifters 166, is raised by the upward movement of these members, as shown in Fig. 23. The two spreaders 141 and 70 now swing into the opened pocket (Figure 24) while the india rubber piece 123 releases the upper pocket layer 168, though the holder 165 still holds fast the lower pocket layer 130. After the two spreaders 141 and 70 have completely stretched out the pocket, the box or capsule loaded with a compressed upholstery spring is introduced by the filling device, not shown, by means of a forked lever 167 (Figs. 12 and 16), as shown in Figures 24 and 26. At the moment when the box is drawn back out of the pocket the hook ends 169, now coming into operation, hold the spring 21 fast, as shown in Figure 19. As soon as the box 131 has left the pocket, the holder 165 also releases the lower pocket layer 130, and the two hook ends 169 then also release the spring, as shown in Figure 20. The pocket band 18 is again fed forward to the extent of one pocket. The india rubber piece 123 executes with the finger 122, under the influence of its two eccentrics 100, 101 and the rodding described, when a spring is filled in, the path indicated by the curve in Figure 25. In this figure the line U—V indicates when the upper pocket layer is seized. V—W indicates when the upper pocket layer is raised and held up, W—X indicates when the upper pocket layer is still held to some extent and just let fall, X—Y indicates when the fabric lifter 118, 121 remains stationary while the two hook ends 169 hold the inserted spring, Y—Z indicates when the india rubber piece 123 and the fabric lifter 118 go in the position of rest shown in Figures 19 and 24 while the two hook ends 169 liberate the spring, Z indicates the position of rest of all the members 165, 123 and 166 (Figure 20) during the forward feeding of the pocket, and Z—U indicates when the parts 165, 123 and 166 are moving into the initial position, as shown in Figures 16 and 21.

The sewing machine 170 (Figures 2, 3 and 13) is secured upon the plate 171, which is supported by means of a joint pivot 174 upon a supporting lever 172, which is mounted fast upon a shaft 173. The shaft 173 is journalled in two bearings 179 on the two standards 1 and 2, as shown in Figure 13. The plate 171, on the other hand, is suspended by means of a joint pivot 175, a suspension arm 176 (Fig. 3) and a pivot 177 upon a standard 178, which is secured upon the standard 2. The suspension arm 176 is of the same length as the supporting lever 172. Since the axis of the sewing needle is about in the middle between the two axes 174 and 175 (Figures 3 and 28) and the levers 172 and 176 are equal in length, as the sewing machine 170 moves to and fro, the point which coincides with the insertion of the needle 180 in the fabric of the pocket band moves approximately upon a horizontal line. For the driving of the sewing machine there serve the belt pulley 28, shown in Figures 3, 5 and 13, a belt 181, a belt pulley 182, which is mounted fast upon a shaft 184 journalled in bearings 183, and also a cord pulley 185 secured upon the shaft 184, and a string 186. The sewing machine, suspended by means of the supporting lever 172 and the suspension arm 176, is reciprocated by means of a lever 187 journalled in the standards 1 and 2 and secured upon the shaft 173, with a roller 188 (Figs. 1 and 13), from a slide track 189 secured to the reciprocating slide 27. The length of the levers 187, 172 and 176, and the angular position thereof, as well as the position of the slide track 189 in relation to this angular position, are so selected that the travel of the sewing machine is equal to $$\frac{R}{2}$$

while the slide 27 executes the path R shown in Figure 28. The slide track is so fitted to the slide that the sewing machine moves from the back to the front, that is to say, from A to B in Fig. 28, as soon as the pocket band or the slide moves towards the sewing machine, that is, from A' to B'.

*Regulator.*—The path EW which the uppermost point of the arcuate guide 37 traverses at every revolution of the eccentric 36 (the throw of the eccentric) is always equal in magnitude, at every adjustment of the connecting rod 32, to the scale 190 of the arcuate guide 37. The ratio R of the pocket band (Figure 4a), however, is not always exactly the same, because the pocket band consists of extensible material, that is to say, it may be somewhat greater or less than the path adjusted for this ratio, which is imparted to the slide 27 by the connecting rod 32. On account of this difference a regulation of the conveyor travel is necessary, so as to permit different compensating slide travels SW (Fig. 5) of the slide while the eccentric throw EW has been adjusted once for all and remains constant. As already mentioned above the two spreaders 141 and 70 are adjustable, by means of the two lugs 152 held on the lever 154 (Fig. 3) by a screw 153, to the various pocket breadths X (Fig. 27). The lever 154 is rotatably supported on the pivot 191 and is connected at the lower part by a rod 192 with a shorter lever 193, which is mounted upon a shaft 194, which is journalled in the two standards 1 and 2, and upon which is provided a regulating lever 195 (Fig. 3) in the neighbourhood of the standard 1. To one end of this regulating lever is fitted a knife edge 196, bent at right angles, which is located in one plane with the step piece 197 of the step lever 33. By means of a weight 198 mounted upon the other and shorter arm of the regulating lever the whole of the rodding described is to some extent counterbalanced.

Now since before the introduction of the spring the pocket axis TA is located to right or left in relation to the box axis KA (Figure 27) a correction has to be effected, in order that the pocket axis may be in line with the box axis. This correction is initiated by the members 70, 141, 154 and 195 described above, and is carried out in the manner described below.

The tension spring 60 (Fig. 3) does not come into action during the movement of the slide, inasmuch as the knife edge 196 does not come into contact with the steps of the step lever 33, when the slide is moving forwards. It only comes into operation when the step lever strikes with one of its steps against the knife edge 196, while the slide is moving forwards. The pull of the spring should be somewhat greater than the frictional resistance which is involved by the weight of the slide and of the part of the pocket band located between the pressing means and the table 24 (Fig. 3), and which opposes the backward movement.

Before the machine begins the work a pocket axis TA is brought into line with the axis KA of the box 131 (Fig. 27), the regulating lever 195 assuming the mean height indicated in Figure 3. Now in order that an accidental inexactitude in the relationship of the pocket band to the path SW (Fig. 5) of the slide 27 adjusted for this ratio R may be capable of regulation to exact agreement of the axes KA and TA, the pivotal point 34 for the connecting rod 32 on the stepped lever 33 is located lower down than the pivot 57 of the lever 33 on the slide 27. By this means a double-armed lever 33 is provided, with the upper arm from 34 to 57 and the lower arm from the pivotal point 34 downwards to the six steps 1 to 6 at the lower bent end 197. The regulator lever 195 is so supported at the pivotal point 194 that during its up and down movement the knife edge 196 can be moved past the steps 1 to 6. The employment of this double-armed lever 33 in conjunction with the regulating lever 195 is for the purpose of imparting paths of different lengths to the slide 27, with the different lever paths of the lever arm lengths yielded about the pivotal point 34 from the point 34 to the point 57 and from the point 34 to the six steps, with constant travel of the eccentric roller 29. The arm lengths of the lever 33 from the point 34 downwards to the different steps may for example be so calculated that each successive step imparts to the travel of the slide 27 as determined by the eccentric gear an addition of 1 millimetre.

When the pin 137 of the connecting rod 32 adjusted upon the scale 190 travels a distance EW, and the regulating lever 195, as shown in full lines in Fig. 5, is in its upper position, the slide 27 traverses a path SW, which is equal to EW, because the lower arm of the lever 33 does not come into action, since it does not reach the knife edge 196 of the lever 195. If, however, the regulating lever 195 is in its lower position, as shown in dot and dash lines in Figure 5, although the stroke EW of the connecting rod 32 remains the same, the lever 33 strikes upon the knife edge 196 with the step 6 during the forward movement of the slide 27 before the slide has reached its foremost position. Consequently from this moment onwards the lever 33 swings about the point of engagement of the knife edge 196 with the step 6, so that the slide 27 travels an additional distance of 6 millimetres for example, that is to say, $SW_1 = EW + 6$ millimeters. If the regulating lever 195 is in its intermediate position, as shown in Figure 3, in consequence of the step 3 striking against the knife edge 196 the path of the slide will be 3 millimetres greater than the throw of the eccentric if the lever is in its foremost position, that is to say, SW₂=EW+3 millimetres. Now in order that the positive and negative differences in the pocket ratio of 3 millimetres each may be able to be equalized, according as TA$^r$ or TA$^l$ are to the right or to the left of TA (Fig. 27), at this height of the regulating lever 195, at which, as explained above with reference to Figures 26 and 27, the axis of the pocket is in a line with that of the box, the normal slide travel, with the addition of a supplementary travel of 3 millimetres, is to correspond to the ratio R of the pocket. In order to attain this result the stroke EW of the connecting rod 32 must be diminished by 3 millimetres, which is effected by adjusting the connecting rod 32 so much lower upon the scale 190 that the new travel ew of the connecting rod is equal to EW−3 millimetres.

When the regulating lever 195 is in the uppermost or inoperative position, illustrated in full lines in Fig. 5, a travel sw is imparted to the slide 27 by the new travel ew of the connecting rod 32, that is to say, ew=sw.

The new travel ew of the connecting rod 32 corresponds to the normal ratio R, because the previous travel EW, now shortened by 3 millimetres, is taken up again, and, with the regulating lever 195 in the mid position, by virtue of the lever arm relationships, the slide 27 receives a supplementary travel of 3 millimetres in addition to the travel ew, that is to say, $$ew = R - 3$$
$$sw_1 = ew + 6$$

or $$sw_1 = R - 3 + 6 = \underline{R+3}$$

moreover $$sw_2 = ew + 3$$

or $$sw_2 = R - 3 + 3 = R$$
$$sw = ew = \underline{R - 3}$$

So long, therefore, as the two centre lines or axes TA and KA are in a line in filling the pockets, the lever 154 remains stationary. As soon, however, as a small difference occurs in the position of these two axes, for instance if the pocket axis TA$^r$ lies to the right of the box axis KA, looking in the direction from the pocket band to the box, this yields a pressure upon the left hand spreader 141 as soon as the two flaps 155 and 156 press the pocket band on to the table. This pressure upon the spreader 141 effects a movement of the lower arm of the lever 154 (Figure 3) to the left, and therefore a downward movement of the longer arm of the regulator lever 195. If the contrary occurs, that is to say, if the axis TA$^l$ of the pocket, as seen from the outside, is to the left of the box axis, this causes a pressure upon the right hand spreader 70 and an upward movement of the longer arm of the regulating lever 195.

It follows from this that a positive or negative difference, made operative by the rocking in of the two spreaders 141 and 70, in the position of the axis TA of the pocket to be filled with an upholstery spring, in relation to the box axis KA, has an influence upon the height of the regulating lever 195, and that furthermore, according to the height of the latter, by the corresponding step of the stepped piece 197 striking against the knife edge 196, a corresponding lengthening or shortening is imparted to the slide 27, in consequence of the above-mentioned lever transmission ratios in addition to the travel of the slide determined by the throw of the eccentric.

Figure 31:
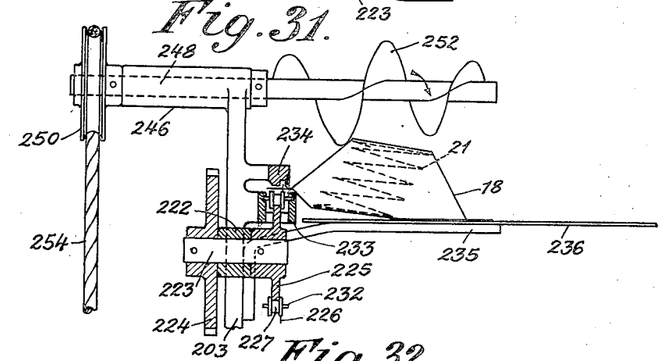
Figures 31 and 32 show sections on the lines XXXI—XXXI and XXXII—XXXII in Figure 1 of the device for turning the springs that are in the pockets.
Figure 32:
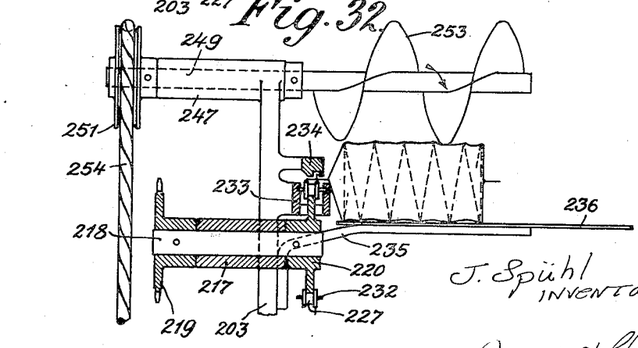

The pulling and turning mechanism serves on the one hand to advance the part of the pocket band that has been filled with upholstery springs and sewn up, after this part has left the slide 27, and on the other hand to bring the band underneath turning worms (Figs. 1, 2, 3, 31 and 32), in order that the spring 21 (Fig. 31), which is still incorrectly positioned in the pocket, may be turned through 90°, with the axis of the spring in the operative direction, as shown in Figure 32.

The plate 55 secured upon the front end of the standards 1 and 2 carries two bearings 201 and 202 and a bearing block 203, shown in Figures 1 and 3. In the bearing 201 and in the bearing block 203 is journalled a shaft 204, which carries a ratchet wheel 205, a ratchet lever 206, with a pawl 207, and a toothed wheel 208, shown in Figures 2 and 3. A shaft 209 (Fig. 29) running in the bearings 202 and 203 carries a chain wheel 210, a toothed wheel 211 meshing with the toothed wheel 208, and chain wheels 212 and 212′. A shaft 213 resting in the bearings 202 and 203 carries chain wheels 214 and 214′, which are connected with the wheels 212 and 212′ by chains 216 and 216′. In a bearing 217 on the bearing block 203 runs a shaft 218, which carries chain wheels 219 and 220, shown in Figures 2 and 32. The wheel 219 is connected by a chain 221 with the wheel 210. In a bearing 222 (Fig. 30) runs a short shaft 223, which carries a toothed wheel 224 and a chain wheel 225 (Figs. 3 and 30), which is connected with the chain wheel 220 by a chain 227. In a bearing 228 (Fig. 30) on the bearing block 203 is journalled a shaft 229, which carries an india rubber roller 230 and a toothed wheel 231, which meshes with the toothed wheel 224, as shown in Figure 2.

Figure 29:
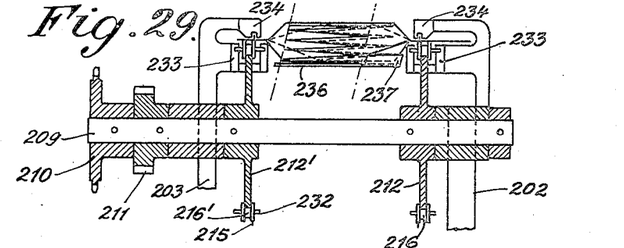
Figure 29 shows a section on the line XXIX—XXIX in Figure 1, of a device for preparing to turn the springs that have been introduced into the pockets.

The inner links of the chains 216, 216′ and 227, that is to say, those located towards the inside of the machine, are provided with pointed tips or prongs 215 and 226 respectively (Figs. 29 and 31), and their articulation pins 232 are prolonged inwards and outwards and run in the upper side of the chain in grooves in straight line guiding rails 233, shown in Figure 29, which are secured to the bearings 202 and 203. The tips 215 and 226 run in the upper grooved bars 234, which are secured to these bearings. To the bearing block 203 is fitted (Figures 3, 31 and 32) by means of iron flats 235 a table plate 236. Between the two chains 216 and 216′ is fitted upon the table plate 236, obliquely to the direction of these chains, a run-up edge 237, shown in Figures 2 and 29. The ratchet lever 206 is connected by a rod 238 and a pivot 239 (Figures 2 and 3) with the slide 27. The bearing block 203 is provided underneath, midway between the two bearings 217 and 222, with an eye 240 (Figures 2 and 3), in which an axial pin 241 is mounted. The latter carries rope pulleys 242 and 243 rigidly connected with one another, of which the pulley 242 is driven, by means of a cord 244, by a cord pulley 245 mounted upon the shaft 184, shown in Figures 1 and 3. In bearings 246 and 247 (Figures 31 and 32), which are fitted to the bearing block 203, run shafts 248 and 249, which carry rope pulleys 250 and 251 and turning worms 252 and 253. The three rope pulleys 243, 250 and 251 are driven by a cord 254.

*Method of working of the machine.*—The machine can fill unlimited lengths of pocket bands with springs, if individual pieces of such bands are sewn to one another whenever this is necessary. The driving belt 186 of the sewing machine 170 (Fig. 3) is first adjusted for idle running, and the needle 180 raised. The empty pocket band is first passed by hand over and under the rods 25 and under the upstanding flaps 156 and 155, shown in Figures 1 and 2. The lever 95 (Fig. 14) is now pressed downwards by hand, in order that the pressing rules 83 and 84 may move away from one another, and that the band may be passed between these rules and between the chain wheels 212, 212' and the grooved bars 234 right to the pulling chains 216 and 216' (Figs. 1 and 3) and can be engaged by their prongs 215. The toothed wheel gear 208, 211 (Fig. 2) is rotated by means of a crank, not shown, until the first pocket passes between a small table 255 and an india rubber roller 230 on to a chain conveyor 227. The ratio R of the pocket is now so adjusted with the connecting rod 32 upon the scale 190 of the lever 30 (Figs. 3 and 5) that to the slide 27 a travel less than R by 3 millimetres is imparted, the regulating lever being however raised so high by hand that the knife edge 196 is located opposite to the step 3. The band 18 is now so adjusted that the axis TA of the pocket exactly agrees with the axis KA of the two-part box 131 (Fig. 26), after the latter has first been adjusted to correspond to the breadth or diameter of the spring to be introduced and is provided by hand with the first such spring. The two spreaders 141 and 70 are also adjusted by means of the two lugs 152 (Figs. 33 and 34) to correspond to the breadth X (Fig. 27) of the pocket, and the lever 154 is placed exactly in an upright position, so that the centre between the two spreaders agrees with that of the box. The regulating lever 195 then stands midway between its upper and lower positions, so that the stepped piece 197 of the step lever 33 runs up on to the knife edge 196 with the step 3 at the given moment, as shown in Figure 3. The press rules 83, 84 are then allowed to hold fast the band 18 again.

The winding machine for the upholstery springs, which may be provided with a known filling device, is so connected with the present machine that the countershaft 13 and the main shaft 5 (Fig. 1) revolve once for each spring 21 delivered by the winding machine. The belt pulley 28 (Fig. 5) provided with the cam groove 36 is first rotated by hand so that the slide 27 is located in its foremost position, approximately as shown in Figure 5. The sewing machine 170 is then likewise located in its foremost position at B, as shown in Figure 28.

After the belts 186 and 244 for the driving of the sewing machine 170 and of the turning worm 252 are put on and the sewing machine is threaded, the machine is set in motion by the winding machine. The slide 27 moves in a rearward direction, being driven by the cam groove 36 (Fig. 5) by means of the swing lever 30 and of the suspended rodding 32 and 33, for the tension spring 60 (Figure 3) is so strong that the lever arm 58 bears upon the stop 61. The two half cams 91 (Fig. 14) open the press rules 83 and 84 owing to co-operation of the parts 92, 93, 95, 90 and 71, as soon as the slide 27 moves rearwards, and set free the pocket band. The latter is therefore stationary, but the sewing machine moves from B to A, sewing on the side of the band 18, under the action of the inclined guide 189 located on the slide and of the levers 172 and 187 (Fig. 28), this distance from B to A corresponding to half the ratio R. Meanwhile the flaps 155 and 156 (Fig. 27) under the action of the eccentrics 161 and 164 (Figures 11 and 12) mounted upon the main shaft 5, press the pocket band on to the lower plate 44. In conjunction with this is effected the opening of a succeeding pocket previously prepared as regards the filled box, by the three cam grooves of the eccentrics 99, 100 and 101, the levers 125, 104 and 115 (Fig. 15) with suspended rodding, and the finger 122, with the india rubber piece 123, the lifter 118 and the holder 165. The two spreaders 141 and 70 mounted upon the two rods 149 and 69 at this time receive the necessary rotary or rocking-in movement from the cam groove of the eccentric 142 (Fig. 11), the lever 144, with suspended rodding 145 and the two toothed segments 150 and 151. There is also effected by the cam groove of the eccentric 140 (Fig. 12) the lever 138 and the rod 136, the introduction of the box 131, the holding back of the spring 21 by the two hooks 169 (Figure 19), while the empty box is drawn out of the pocket, as illustrated in Figures 16 and 20.

If there is a differentiation between the positions of the axes TA and KA of the pocket and of the box, the lever 154 will execute an oscillation in one direction or the other, according as one or the other of the struts receives the greater pressure on the associated pocket seam when swinging into the pocket.

The further functioning of the ratio regulator will be described below.

As soon as an upholstery spring has been introduced into the first pocket, that is to say, the finger 122, 123 (Fig. 15), with the lifter 118, 166 and the holder 165 are still raised, the empty box is located outside the pocket, as shown in Figure 20, the flaps 155 and 156 are again raised, the slide 27 has meanwhile passed into its rearmost position, and the sewing machine, while sewing, has likewise arrived at its rearmost position A. In this position the roller 93 (Fig. 14) leaves the half cam 91, so that in consequence of the action of the two springs 98 (Figures 6 and 14) the upper and lower press rules 83 and 84 (Fig. 8) with stamps 88, and the bar 89, seize the pocket band and convey it through a ratio R, that is to say, one pocket forward, during the forward movement of the slide. During this forward movement of the slide 22, the sewing machine, while sewing, moves by virtue of its cam groove 189 and of the levers 187 and 172 (Figs. 3, 6, and 28) from A towards B, likewise in the forward direction, and only through half the pocket ratio R, since the conveying speed of the pocket band is twice as great as the forward movement of the sewing machine. Since, however, the sewing machine, during the previous stoppage of the pocket band, that is to say, during the succeeding backward movement of the opened slide, which corresponds to a pocket ratio R, has sewn rearwards half this ratio, the sewn seam Z receives a length of twice half R, equals R, for each to-and-fro-movement of the slide. While the slide 27 is moving towards its foremost position, the stepped lever 33 (Figures 3 and 5) strikes with the step 3 against the knife edge 196 of the regulating lever 195, which is located in its mid position, and the slide, in consequence of the lever relationships explained above, executes, besides the travel prescribed by the cam groove 36, an additional travel of 3 millimetres, that is to say, the slide also executes during its forward movement the travel R necessary for one pocket, because in consequence of the aforementioned lever arrangement the connecting rod 32 had to be so adjusted upon the scale 190 of the lever 30 that the forward feed according to the eccentric 36 and the lever 30 is equal to R—3 millimeters, as explained above.

There now follows again the rearward movement of the slide whereby the rollers 93 are drawn down by the half cams 91 (Figure 14), so that the press rules 83 and 84 liberate the pocket band again. There further follow again the operations already described for opening the pocket, introducing the box, filling in the spring and drawing back the box. As soon as the slide 27 approaches its rearmost position, the empty box is drawn out of the pocket by the eccentric 140 (Fig. 12), whereupon by the eccentric 142 (Fig. 11) and the lever 144 the two spreaders 141 and 70 are swung back out of the pocket.

Figure 30:
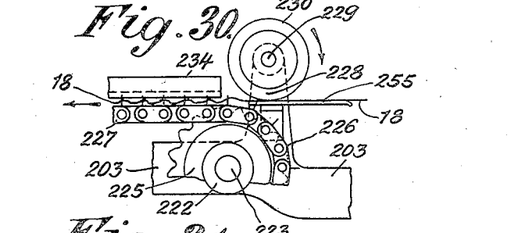
Figure 30 shows a detail of this device.

While the slide 27 is moving forward each time, the ratchet wheel 295 is rotated by the rod 238 and the pawl 297 (Figs. 2 and 3) in a clockwise direction through a certain angle, so that it moves forwards the two chains 216 and 216' by means of the toothed wheels 208 and 211 and of the four chain wheels 212, 212' and 214, 214', allowing for the lengthening or shortening of the normal stroke, because the diameters of the chain wheels and the transmission ratio of the toothed wheels are correspondingly selected. At every advance of the pocket band, therefore, the pocket band, filled with upholstery springs 21, and now sewn up on the side o that was previously open, is drawn along to the same extent by the pulling chains 216 and 216' as it is engaged by the prongs 215 of these chains. Since, as already described above, the springs introduced into their pockets still have to be turned, the spring-filled portion of the band 18 is drawn against the inclined run-on edge 237 (Figures 2 and 29). The more the springs 21, which are located under a certain pressure in the pocket owing to the pulling mechanism and their own resilience, run forward against the run-on edge, the more oblique does the position of the springs become, as shown in Figure 29. The pocket band is now fed in its intermittent movement between the small table 255 (Figures 1 and 30) and the india rubber roller 230 by the prongs 226 of the chain 227 and is brought by the latter underneath the turning worms 252 and 253. In order however that the turning of the springs in their pockets may be better effected, and the springs may stretch out the pockets in consequence of their own resilience, this stress must be to some extent eliminated, which is attained in the following manner. The unwinding of the chain 227 is kept somewhat less by means of the transmission ratio of the toothed wheels 218 and 219 (Figs. 2 and 3) and of the diameters of the chain wheels 220 and 225 than that of the chains 216 and 216'. On the other hand, however, the unwinding of the india rubber roller 230, owing to the transmission ratio of the toothed wheels 224 and 231 (Figs. 2 and 31) is made equal in magnitude to that of the chains 216 and 216', for which reason the pocket band intermittently guided by the india rubber roller on to the prongs of the chain 227 receives folds there, as shown in Figure 30, so that a shrinkage or shortening and corresponding relaxation of tension in the pocket band occurs. When the pocket band advances again the still inclined spring passes under the revolving conical turning worm 252 and is engaged at the top by the latter, in which case, in consequence of its own resilience, which has hitherto still been held under pressure, it jumps easily into the position in its pocket which is necessary for the purpose for which the now finished pocket band is to be employed. The turning worms 252 and 253 are so arranged that the turning of the springs is mainly effected during the stoppage of the pocket band. Since, however, the worms revolve continuously, their action upon the springs may begin somewhat earlier under some circumstances, or may extend somewhat beyond the stoppage of the springs. The worm 252, to which is allotted the main work in turning the springs, is of conical form to facilitate the engagement, while the second worm 253, which only has to come into action if the spring has not been completely turned by the first worm 252, is of cylindrical form.

For the sake of precaution, or if springs of rather stout wire are to be employed, a second turning worm 253 (Fig. 32), and even a third may be employed. Since the chain drive 225, 227, 220 (Fig. 3) is only one sided, the springs have sufficient room for jumping up. The finished pocket band is passed over the plate 236, being removed from the prongs of the chain 227 (Fig. 3) by the lower straight guiding bar 233, which is bent up on the left.

The machine described may be employed for all the sizes of pocket springs in use, only a few adjustments to the machine being necessary, such as, adjusting the box and the pair of spreaders to the diameter of the upholstery spring, and adjusting the travel of the slide 27 to correspond to the breadth of the pockets, whereby the travel for the sewing machine and of the pulling and tensioning chains is determined.

What I claim is:

1. A machine for the manufacture of pocket bands filled with upholstery springs for cushions and mattresses, comprising a conveying device of adjustable stroke for intermittently drawing of a prepared pocket band, an intermittently working spring filling device aside the path of said band and means for automatically adjusting the stroke of said conveying device to the breadth of each individual pocket of said band when a pocket is reaching the position for receiving a spring, for ensuring correct position of each individual pocket relatively to said spring filling device.

2. A machine for the manufacture of pocket bands filled with upholstery springs as claimed in claim 1, comprising a sewing machine movable to and fro approximately parallel to the path of movement of the pocket band in dependence upon the conveying device and adapted to take up the filled pocket from the conveying device, a guide connecting this sewing machine with the conveying device in such a manner that said sewing machine is capable of receiving, for every stroke length of the conveying device, from the latter a travel which is half as great as that of the conveying means.

3. A machine for the manufacture of pocket bands containing upholstery springs, comprising a conveying device adapted to intermittently draw a pocket band and to move relatively to the latter in a direction opposite to the conveying direction, a sewing machine reciprocatable in the conveying direction of said pocket band in such dependence upon the conveying device that the stroke of the sewing machine in either direction is half the stroke of the conveying device, the sewing machine being thus adapted to sew the front half of a pocket of the pocket band on its backward movement together with the conveying device whilst said band is at rest, and to sew the rear half of the same pocket side while moving forward with half the speed of the conveying device and the band.

4. A machine for the manufacture of pocket bands containing upholstery springs, comprising a conveying device of adjustable stroke for intermittently drawing a prepared pocket band, a stationary standard, a suspension arm hanging from this standard, a plate having one end linked to said suspension arm, a supporting lever pivotally connected with the other end of said plate and having the same vertical length as said suspension arm, a sewing machine standing upon said plate in the path of the pocket band, a link lever for actuating said supporting lever, a slide track forming guide for the free end of said link lever, this slide track being displaceable with the conveying device and at an inclination to the horizontal, the arrangement being adapted to impart to the sewing machine, during the movement of the conveying device in either direction, a stroke which is half as great in the same direction.

5. A machine for the manufacture of pocket bands filled with upholstery springs as claimed in claim 1, having means for opening, during the stoppage of the band, the pocket located in a position for the introduction of a spring, this means comprising a fabric lifter, capable of being raised and lowered, with a foot for holding fast the upper layer of the pocket to be opened, and also a finger, adapted to co-operate with this fabric lifter, and provided with a piece of india rubber, for the purpose of stripping the free margin of the upper pocket layer on the fabric lifter foot, and raising it together with the latter, and also a fabric holder, for the purpose of holding fast the lower layer of the pocket to be opened during the opening operation.

6. A machine for the manufacture of pocket bands filled with upholstery springs, comprising a movable fabric lifter foot adapted to press upon the fabric, a finger pivotally connected with said fabric lifter foot, a cam connected with said fabric lifter foot and said finger for imparting them a collective upward movement, a second cam connected with said finger for imparting it an additional lateral movement towards and beyond said lifter foot when this latter is at rest in its lowest position.

7. A machine according to claim 6, comprising a stationary support for the pocket band, a lever-like fabric holder pivoted at this support, a cam connected with this fabric holder and adapted to impart it a movement towards the lower layer of the pocket band lying on said support while said finger makes its lateral movement towards the fabric lifter foot for sliding thereover the upper layer of said band.

8. A machine for the manufacture of pocket bands filled with upholstery springs, comprising a conveying device for intermittently drawing a prepared pocket band, a pressing device connected with said conveying device so as to reciprocate therewith, springs on this pressing device tending to close it, a rotatable semi-circular guide, a swinging lever located between this guide and the pressing device so as to become engaged by said guide and to hold open the pressing device against the action of said springs during the backward movement of the conveying device.

9. A machine for the manufacture of pocket bands filled with upholstery springs as claimed in claim 1, comprising a device for opening, during the stoppage of the band, the pocket located in a position for the introduction of a spring, two spreading members, adjustable to different pocket breadths and capable of being rocked into a fabric pocket, after the opening of the latter, in the direction towards the parallel seams thereof, and a device for regulating the feed of the pocket band, this device being connected with the spreaders in such a way that upon one or other of the spreaders meeting the adjacent pocket seam it is influenced in the direction of increasing or diminishing the forward feed for this pocket.

10. A machine for the manufacture of pocket bands filled with upholstery springs, comprising a conveying device, a lever suspended from this device, a rotatable cam, a swing lever connected with this cam so as to be oscillated thereby, an arcuate guide on this swing lever, the centre of the arc lying on the first mentioned lever below its fulcrum on the conveying device, a connecting rod pivoted to said swing lever and to the other lever on said centre of arc, and a step on the conveying device for arresting the oscillation of the lever suspended therefrom against the action of said connecting rod in order to permit the conveying device to be displaced by this rod on its forward stroke.

11. In a machine according to claim 10, two spreading members capable of being rocked into a fabric pocket in the direction towards the parallel seams thereof, a regulating lever connected with said spreading members so as to receive a motion when one of these members meets a greater resistance in the fabric pocket than the other, a row of steps on the lower end of the lever suspended from the conveying device, said steps having different distances as well from the fulcrum of the regulating lever as from the place where said connecting rod is connected with the depending lever, an engaging member on said regulating lever mounted in the path of the depending lever and adapted to be engaged, near the end of the forward stroke of the conveying device, by one or the other of said steps of the regulating lever.

12. A machine for the manufacture of pocket bands filled with upholstery springs, comprising a conveying device for intermittently transporting the pocket band, a lever suspended from this conveying device, a stop for stopping the rotation of said lever relatively to the conveying device in one direction, a rotatable cam, a rocking lever connected with this cam so as to receive a rocking motion therefrom, a rod connecting this rocking lever with said suspended lever at a point beneath the fulcrum of this lever on the conveying device, a regulating lever adapted to engage with said suspended lever on different distances from its fulcrum on the conveying device, said distances depending from the position of the regulating lever, a lever for controlling the position of the regulating lever relatively to the suspended lever, two spreaders adjustably connected to said lever and adapted to be rocked into a fabric pocket and to impart a rocking motion to this lever in one or the other direction if the axis of symmetry of the spreading device does not meet the axis of the pocket.

13. A machine for the manufacture of pocket bands filled with upholstery springs, comprising a conveying device for intermittently drawing a pocket band, two spreading members pivotally mounted aside the path of the pocket band so as to be capable of being rocked into a fabric pocket, a flap pivotally mounted aside each of said spreading members outside the space between these members, cam discs connected with said flaps adapted to press them on the pocket band immediately before the spreaders swing into the pocket located between the flaps, a device for automatically regulating the stroke of said conveying device, this regulating device being connected with said spreaders in such a manner as to be operated by one or the other thereof when striking against the adjacent seam of a pocket retained by said flaps.

14. A machine as claimed in claim 12, comprising a strong spring connecting with the conveying device the upper arm of the lever which depends from this device, a row of steps on the lower end of said lever, said steps being at different distances both from the point of attachment of said connecting rod to said suspended lever and also from the fulcrum of the regulator lever, a knife edge on this regulator lever opposite said row of steps in the plane of rotation of the suspended lever and adapted to engage with one or the other of said steps in the forward travel of the conveying device so as to become the fulcrum of the lever suspended on this device, the lever transmission ratio of this lever and the stroke of the conveying device being thus determined by the distance of the engaged step from the point of attachment of the connecting rod on the suspended lever.

15. A machine for the manufacture of pocket bands filled with upholstery springs, comprising a reciprocating spring introducing member, two fixed horizontal plates located respectively immediately above and below of the path of said member, an aperture in each of said plates on the same vertical axis one with another, a swing lever on the outside of each of said plates, a cam actuated lever adapted to rock said swing levers in opposite directions, a hook on each of said swing levers adapted to enter through said opening of the corresponding plate and to press upon the band with an obtuse part for the purpose of holding back the spring in the pocket during the rearward movement of the introducing member.

16. A machine for the manufacture of pocket bands filled with upholstery springs as claimed in claim 1, comprising a pulling device for the purpose of pulling forward the part of the pocket band that has left the conveying means, a run-on edge inclined to the direction of pull and thereby gradually narrowing the track of the springs introduced and thereby carrying the latter over into an inclined position, and at least one worm, which is arranged at the end of the run-on edge transversely above the path of the band and which is adapted to press against the obliquely positioned spring.

17. A machine for the manufacture of pocket bands filled with upholstery springs, comprising a conveying device adapted to intermittently draw a pocket band, a reciprocating spring introducing member adapted to introduce a spring into a pocket of said band while this is at rest, a sewing machine mounted in the path of the pocket band sequent to the spring inserting means, a pulling device for the purpose of pulling forward the part of the pocket band that has left the conveying device, a run-on edge inclined to the direction of pull and thereby gradually narrowing the track of the springs introduced, a double-chain gear adapted to engage the pocket band on both longitudinal margins and to draw this band past said run-on edge, a one-sided gear adapted to convey the pocket band slightly less than the first named chain gear, and one or more turning worms which are so arranged above the path of the pocket band that they can turn over the upholstery springs which are located in the pockets.

JULIUS SPÜHL.